US008495346B2

(12) United States Patent
Peleg et al.

(10) Patent No.: US 8,495,346 B2
(45) Date of Patent: Jul. 23, 2013

(54) PROCESSOR EXECUTING PACK AND UNPACK INSTRUCTIONS

(75) Inventors: Alexander Peleg, Haifa (IL); Yaakov Yaari, Haifa (IL); Millind Mittal, San Francisco, CA (US); Larry M. Mennemeier, Boulder Creek, CA (US); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/444,090

(22) Filed: Apr. 11, 2012

(65) Prior Publication Data
US 2012/0198210 A1 Aug. 2, 2012

Related U.S. Application Data

(60) Continuation of application No. 13/108,723, filed on May 16, 2011, now Pat. No. 8,190,867, which is a continuation of application No. 11/451,906, filed on Jun. 12, 2006, now Pat. No. 7,966,482, which is a division of application No. 10/185,896, filed on Jun. 27, 2002, which is a division of application No. 09/657,448, filed on Sep. 8, 2000, now Pat. No. 6,516,406, which is a continuation of application No. 08/974,435, filed on Nov. 20, 1997, now Pat. No. 6,119,216, which is a division of application No. 08/791,003, filed on Jan. 27, 1997, now Pat. No. 5,802,336, which is a continuation of application No. 08/349,047, filed on Dec. 2, 1994, now abandoned.

(51) Int. Cl.
*G06F 9/315* (2006.01)
(52) U.S. Cl.
USPC ............................................. 712/300; 712/7

(58) Field of Classification Search
None
See application file for complete search history.

(56) References Cited

U.S. PATENT DOCUMENTS

| 3,541,516 A | 11/1970 | Senzing |
| 3,711,692 A | 1/1973 | Batcher |
| 3,723,715 A | 3/1973 | Chen et al. |
| 4,139,899 A | 2/1979 | Tulpule et al. |
| 4,141,005 A | 2/1979 | Bonner et al. |

(Continued)

FOREIGN PATENT DOCUMENTS

| EP | 0395348 | 10/1990 |
| EP | 0463975 | 1/1992 |

(Continued)

OTHER PUBLICATIONS

"Complaint", In the United States District Court for the District of Delaware, In the matter of *Transmeta v. Intel Corporation*, (Oct. 11, 2006), 1-7.

(Continued)

*Primary Examiner* — Kenneth Kim
(74) *Attorney, Agent, or Firm* — Blakely, Sokoloff, Taylor & Zafman LLP

(57) ABSTRACT

A processor. The processor includes a first register for storing a first packed data, a decoder, and a functional unit. The decoder has a control signal input. The control signal input is for receiving a first control signal and a second control signal. The first control signal is for indicating a pack operation. The second control signal is for indicating an unpack operation. The functional unit is coupled to the decoder and the register. The functional unit is for performing the pack operation and the unpack operation using the first packed data. The processor also supports a move operation.

11 Claims, 14 Drawing Sheets

U.S. PATENT DOCUMENTS

| | | |
|---|---|---|
| 4,161,784 A | 7/1979 | Cushing et al. |
| 4,229,801 A | 10/1980 | Whipple |
| 4,393,468 A | 7/1983 | New |
| 4,418,383 A | 11/1983 | Doyle et al. |
| 4,481,580 A | 11/1984 | Martin et al. |
| 4,498,177 A | 2/1985 | Larson |
| 4,595,911 A | 6/1986 | Kregness et al. |
| 4,707,800 A | 11/1987 | Montrone et al. |
| 4,760,525 A | 7/1988 | Webb |
| 4,771,379 A | 9/1988 | Ando et al. |
| 4,825,355 A | 4/1989 | Kurakazu et al. |
| 4,868,748 A | 9/1989 | Crawford et al. |
| 4,903,228 A | 2/1990 | Gregoire et al. |
| 4,989,168 A | 1/1991 | Kuroda et al. |
| 4,992,938 A | 2/1991 | Cocke et al. |
| 5,008,812 A | 4/1991 | Bhandarkar et al. |
| 5,081,698 A | 1/1992 | Kohn |
| 5,091,848 A | 2/1992 | Kojima |
| 5,095,457 A | 3/1992 | Jeong |
| 5,127,098 A | 6/1992 | Rosenthal et al. |
| 5,168,571 A | 12/1992 | Hoover et al. |
| 5,187,679 A | 2/1993 | Vassiliadis et al. |
| 5,193,159 A | 3/1993 | Hashimoto et al. |
| 5,212,777 A | 5/1993 | Gove et al. |
| 5,241,635 A | 8/1993 | Papadopoulos et al. |
| 5,265,204 A | 11/1993 | Kimura et al. |
| 5,267,350 A | 11/1993 | Matsubara et al. |
| 5,268,854 A | 12/1993 | Ikumi |
| 5,268,995 A | 12/1993 | Diefendorff et al. |
| 5,276,891 A | 1/1994 | Patel |
| 5,327,543 A | 7/1994 | Miura et al. |
| 5,390,135 A | 2/1995 | Lee et al. |
| 5,408,670 A | 4/1995 | Davies |
| 5,423,010 A | 6/1995 | Mizukami |
| 5,426,783 A | 6/1995 | Norrie et al. |
| 5,465,374 A | 11/1995 | Dinkjian et al. |
| 5,467,473 A | 11/1995 | Kahle et al. |
| 5,481,719 A | 1/1996 | Ackerman et al. |
| 5,487,159 A | 1/1996 | Byers et al. |
| 5,499,352 A | 3/1996 | Clift et al. |
| 5,499,376 A | 3/1996 | King et al. |
| 5,507,000 A | 4/1996 | Stewart et al. |
| 5,519,841 A | 5/1996 | Sager et al. |
| 5,522,051 A | 5/1996 | Sharangpani et al. |
| 5,535,397 A | 7/1996 | Durante et al. |
| 5,537,606 A | 7/1996 | Byrne et al. |
| 5,541,865 A | 7/1996 | Ashkenazi et al. |
| 5,546,554 A | 8/1996 | Yung et al. |
| 5,560,035 A | 9/1996 | Garg et al. |
| 5,590,350 A | 12/1996 | Guttag et al. |
| 5,594,437 A | 1/1997 | O'Malley |
| 5,625,374 A | 4/1997 | Turkowski |
| 5,634,118 A | 5/1997 | Blomgren |
| 5,649,225 A | 7/1997 | White et al. |
| 5,651,125 A | 7/1997 | Witt et al. |
| 5,657,253 A | 8/1997 | Dreyer et al. |
| 5,669,012 A | 9/1997 | Shimizu et al. |
| 5,675,526 A | 10/1997 | Peleg et al. |
| 5,675,777 A | 10/1997 | Glickman |
| 5,677,862 A | 10/1997 | Peleg et al. |
| 5,680,161 A | 10/1997 | Lehman et al. |
| 5,687,336 A | 11/1997 | Shen et al. |
| 5,696,955 A | 12/1997 | Goddard et al. |
| 5,701,508 A | 12/1997 | Glew et al. |
| 5,721,892 A | 2/1998 | Peleg et al. |
| 5,734,874 A | 3/1998 | Van Hook et al. |
| 5,752,001 A | 5/1998 | Dulong |
| 5,760,792 A | 6/1998 | Holt et al. |
| 5,781,457 A | 7/1998 | Cohen et al. |
| 5,802,336 A | 9/1998 | Peleg et al. |
| 5,819,101 A | 10/1998 | Peleg et al. |
| 5,835,748 A | 11/1998 | Orenstein et al. |
| 5,835,782 A | 11/1998 | Lin et al. |
| 5,852,726 A | 12/1998 | Lin et al. |
| 5,857,096 A | 1/1999 | Bistry et al. |
| 5,862,067 A | 1/1999 | Mennemeier et al. |
| 5,881,275 A | 3/1999 | Peleg et al. |
| 5,909,552 A | 6/1999 | Jensen et al. |
| 5,938,756 A | 8/1999 | Van Hook et al. |
| 5,940,859 A | 8/1999 | Bistry et al. |
| 6,115,812 A | 9/2000 | Abdallah |
| 6,119,216 A | 9/2000 | Peleg et al. |
| 6,516,406 B1 | 2/2003 | Peleg et al. |

FOREIGN PATENT DOCUMENTS

| | | |
|---|---|---|
| EP | 0485776 | 5/1992 |
| EP | 0605868 | 7/1994 |
| GB | 1534230 | 11/1978 |
| WO | WO9208188 | 5/1992 |
| WO | WO9301543 | 1/1993 |

OTHER PUBLICATIONS

"First Amended Complaint", In the United States District Court for the District of Delaware, In the matter of *Transmeta Corporation* v. *Intel Corporation*, C.A. No. 06-663 (GMS), (Dec. 12, 2006), 1-8.

"Intel Corporation's Answer, Affirmative Defenses, and Counterclaims to Transmeta's First Amended Complaint", In the United States District Court for the District of Delaware, In the matter of *Transmeta Corporation* v. *Intel Corporation*, Civil Action No. 06-663-GMS, (Jan. 9, 2007), 1-27.

"Transmeta Corporation's Reply to Intel Corporation's Counterclaims to the First Amended Complaint", In the United States District Court for the District of Delaware, In the matter of *Transmeta* v. *Intel Corporation*, (Feb. 28, 2007), 1-20.

"Transmeta Corporation's Responses to Intel Corporation's First Set of Interrogatories (Nos. 1-20)", In the United States District Court for the District of Delaware, In the matter of *Transmeta Corporation* v. *Intel Corporation*, May 21, 2007, 42 pages.

U.S. Appl. No. 11/451,906, "Office Action", (Dec. 26, 2006).

Aho, Alfred V., et al., "The Design and Analysis of Computer Algorithms", *Addison-Wesley*, (1974), pp. 428-450.

Convex Computer Corporation, "C4/XA Architecture Overview", *Convex Technical Marketing*, (Feb. 1994), 279 pages.

Convex Computer Corporation, "Convex C3400 Supercomputer System Overview", *Revision 2.01*, (Jul. 24, 1991), 55 pages.

Convex Computer Corporation, "Saturn Architecture Specification", (Apr. 29, 1993), 88 pages.

Diefendorff, Keith, et al., "Organization of the Motorola 88110 Supercalar RISC Microprocessor", No. 2, Los Alamitos, California, (Apr. 1992), pp. 40-63.

Digital Equipment Corporation, "DECsystem-10/DECsystem-20 Processor Reference Manual AD-H391A-T1", (Jun. 1982), 514 pages.

EP95943362, "Supplemental Partial Search Report", (Sep. 14, 2001), 1 page.

EP96944983, "Supplemental Partial Search Report", (Sep. 15, 1999), 2 pgs.

Gove, "The MVP: A Highly-Integrated Video Compression Chip", *Proc. IEEE Data Compression Conference*, (Mar. 1994), 10 pages.

Guttag, et al., "A Single-Chip Multiprocessor for Multimedia: The MVP", *IEEE Computer Graphics and Applications*, (Nov. 1992) 12 pages.

Gwennap, Linley, "UltraSparc Adds Multimedia Instructions", *Other New Instructions Handle Unaligned and Little-Endian Data*, Microprocessor Report, (Dec. 5, 1994) pp. 16-18.

Hewlett Packard, "HP Precision Architecture Handbook", *TMTA 0127178*, (Jun. 1987), 1:1-1:7; 2:1-2:14; 3:1-3:14, 5:1-5:23; 5:25; 5:80-5:81; 5:129.

Hewlett Packard, "PA-RISC 1.1 Architecture and Instruction Set Reference Manual", *3rd Edition*, (Feb. 1994), 424 pages.

Intel Corporation, "Intel 80386 Programmer's Reference Manual", (1986), 421 pages.

PCT/US95/15713, "International Search Report", (Mar. 12, 1996), 2 pages.

PCT/US96/20516, "International Search Report", (Apr. 18, 1997), 1 page.

PCT/US96/20522, "International Search Report", (Apr. 23, 1997), 3 pages.

PCT/US96/20572, "International Search Report", (Mar. 21, 1997), 1 pages.
PCT/US96/20573, "International Search Report", (Mar. 11, 1997), 1 pages.
Texas Instruments, "TMS320C80 (MVP) Master Processor User's Guide", (1995), 595 pages.
"Final Joint Claim Chart", In the United States District Court for the District of Delaware, In the Matter of *Transmeta Corporation* v. *Intel Corporation*, C.A. No. 06-663 (GMS), (Oct. 10, 2007), pp. 1-215.
"Intel Corporation's Opening Claim Construction Brief", In the United States District Court for the District of Delaware, In the Matter of *Transmeta Corporation* v. *Intel Corporation*, C.A. No. 06-663-GMS, (Oct. 19, 2007), pp. 1-76.
"Intel Corporation's Responses to Transmeta's First Set of Interrogatories of Intel Corporations (Nos. 1-24)", In the United States District Court for the District of Delaware, In the Matter of *Transmeta Corporation* v. *Intel Corporation*, C.A. No. 06-633-GMS, (May 18, 2007), pp. 1-132.
"Intel Corporation's Supplemental Responses to Transmeta Interrogatory Nos. 8, 9, 12, 19 and 21-23", In the United States District Court for the District of Delaware, In the Matter of *Transmeta Corporation* v. *Intel Corporation*, C.A. No. 06-633-GMS, (Aug. 23, 2007), pp. 1-27.
"Transmeta Corporation's Amended and Supplemental Responses to Intel Corporation's First Set of Interrogatories (Nos. 1, 3, 4, 5, 8, 13, 15)" (Redacted Version), In the United States District Court for the District of Delaware, In the Matter of *Transmeta Corporation* v. *Intel Corporation*, C.A. No. 06-633-GMS, (Aug. 23, 2007), 84 pages (including Exhibits 15-18 totaling 46 pages).
"Transmeta Corporation's Opening Claim Construction Brief", In the United States District Court for the District of Delaware, In the Matter of *Transmeta* v. *Intel Corporation*, C.A. No. 06-633-GMS, (Oct. 19, 2007), pp. 1-66.
Transmeta Corporation, "Transmeta Announces Settlement of Patent Litigation, Technology Transfer and License Agreement with Intel", *Press Release*, printed from the Internet site (http://investor.transmeta.com/releasedetail.cfm?ReleaseID=271024), (Oct. 24, 2007), one page.
Kawakami, Y., et al., "A Single-Chip Digital Signal Processor for Voiceband Applications," IEEE, 1980 International Solid-State Circuits Conference, pp. 40-41.

UltraSPARC Multimedia Capabilities On-Chip Support for Real0-Time Video and Advanced Graphics; SPARC Technology Business, Sep. 1994, Sun Microsystems, Inc.
Case, B., "Philips Hopes to Displace DSPs with VLIW, TriMedia Processors Aimed at Future Multimedia Embedded Apps," Microprocessor Report, Dec. 1994, pp. 12-18.
Gwennap, L., "New PA-RISC Processor Decodes MPEG Video, HP's PA-7100LC Uses New Instructions to Eliminate Decoder Chip," Microprocessor Report, Jan. 1994, pp. 16-17.
TMS320c2X, User's Guide, Digital Signal Processing Products, Texas Instruments, 1993, pp. 3-2-3-11; 3-28-3-34; 4-1-4-22; 4-41; 4-103; 4-119; 4-120; 4-122; 4-150; 4-151.
i860 TM. Microprocessor Family Programmer's Reference Manual, Intel Corporation, 1992, Chapters 1, 3, 8, and 12.
Lee, R.B., "Accelerating Multimedia with Enhanced Microprocessors," IEEE Micro, Apr. 1995, pp. 22-32.
Pentium Processor's User's Manual, vol. 3: Architecture and Programming Manual, Intel Corporation, 1993, Chapters 1, 3, 4, 6, 8, and 18.
Margulis, N., "i860 Microprocessor Architecture," McGraw Hill, Inc., 1990, Chapters 6, 7, 8, 10, and 11.
Intel i750, i860 TM, i960 Processors and Related Products, 1993, pp. 1-3.
Motorola MC88110 Second Generation RISC Microprocessor User's Manual, Motorola, Inc., 1991.
MC88110 Second Generation-RISC Microprocessor User's Manual, Motorola, Inc., Sep. 1992, pp. 2-1 through 2-22, 3-1 through 3-32, 5-1 through 5-25, 10-62 through 10-71, Index 1 through 17.
Errata to MC88110 Second Generation RISC Microprocessor User's Manual, Motorola, Inc., 1992, pp. 1-11.
MC88110 Programmer's Reference Guide, Motorola, Inc., 1992, pp. 1-4.
Shipnes, J., "Graphics Processing with the 88110 RISC Microprocessor," Motorola, Inc., IEEE, No. 0-8186-26455-0/92, 1992, pp. 169-174.
Texas Instruments, "TMS320C80 (MVP) Parallel Processor User's Guide", (1995), 705 pages.
Sun Microsystems, "UltraSPARC User's Manual UltraSPARC-I UltraSPARC-II", Jul. 1997, 408 pages.
Findley et al, "Data packing and unpacking scheme for highperformance image processing", IBM TDB, Jul. 1, 1993.

| 63 | 55 54 | 47 46 | 39 38 | 31 30 | 22 | 15 14 | 7 6 | 0 |
|---|---|---|---|---|---|---|---|---|
| bbbb bbbb | bbbb bbbb | bbbb bbbb | bbbb bbbb | bbbb bbbb | | bbbb bbbb | bbbb bbbb | bbbb bbbb |

Unsigned Packed Byte In-register Representation 510

| 63 | 55 54 | 47 46 | 39 38 | 31 30 | 22 | 15 14 | 7 6 | 0 |
|---|---|---|---|---|---|---|---|---|
| sbbb bbbb | sbbb bbbb | sbbb bbbb | sbbb bbbb | sbbb bbbb | | sbbb bbbb | sbbb bbbb | sbbb bbbb |

Signed Packed Byte In-register Representation 511

FIG. 5B

| 63 | 47 46 | 31 30 | 15 14 | 0 |
|---|---|---|---|---|
| wwwww wwwww wwwww w | wwwww wwwww wwwww w | wwwww wwwww wwwww w | wwwww wwwww wwwww w | |

Unsigned Packed Word In-register Representation 512

| 63 | 47 46 | 31 30 | 15 14 | 0 |
|---|---|---|---|---|
| swww wwwww wwwww w | swww wwwww wwwww w | swww wwwww wwwww w | swww wwwww wwwww w | |

Signed Packed Word In-register Representation 513

FIG. 5C

| 63 | 31 30 | 0 |
|---|---|---|
| dddd dddd dddd dddd dddd dddd dddd | | dddd dddd dddd dddd dddd dddd dddd dddd |

Unsigned Packed Doubleword In-register Representation 514

| 63 | 31 30 | 0 |
|---|---|---|
| sddd dddd dddd dddd dddd dddd dddd | | sddd dddd dddd dddd dddd dddd dddd dddd |

Signed Packed Doubleword In-register Representation 515

FIG. 5D

PROCESSOR EXECUTING PACK AND UNPACK INSTRUCTIONS

The present patent application is a Continuation of U.S. patent application Ser. No. 13/108,723, filed on May 16, 2011, now U.S. Pat. No. 8,190,867, which is a Continuation of U.S. patent application Ser. No. 11/451,906, filed on Jun. 12, 2006, now U.S. Pat. No. 7,966,482, which is a Divisional of U.S. patent application Ser. No. 10/185,896, filed Jun. 27, 2002, currently pending, which is a Divisional of U.S. patent application Ser. No. 09/657,448, filed Sep. 8, 2000, now U.S. Pat. No. 6,516,406, which is a Continuation of U.S. patent application Ser. No. 08/974,435, filed Nov. 20, 1997, now U.S. Pat. No. 6,119,216, which is a Divisional of U.S. patent application Ser. No. 08/791,003, filed Jan. 27, 1997, now U.S. Pat. No. 5,802,336, which is a Continuation of U.S. patent application Ser. No. 08/349,047, filed Dec. 2, 1994, abandoned. U.S. patent application Ser. No. 13/108,273 and U.S. patent application Ser. No. 08/349,047 are hereby incorporated herein by reference.

BACKGROUND OF THE INVENTION

1. Field of Invention

The present invention includes an apparatus and method of performing operations using a single control signal to manipulate multiple data elements. The present invention allows execution of move, pack and unpack operations on packed data types.

2. Description of Related Art

Today, most personal computer systems operate with one instruction to produce one result. Performance increases are achieved by increasing execution speed of instructions and the processor instruction complexity, and by performing multiple instructions in parallel; known as Complex Instruction Set Computer (CISC). Such processors as the Intel 80386™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported cooperation (CSC—the integration of teleconferencing with mixed media data manipulation), 2D/3D graphics, image processing, video compression/decompression, recognition algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image) but have much wider data busses and registers. Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

SUMMARY OF THE INVENTION

A processor having improved data manipulation operations is described.

A processor. The processor includes a first register for storing a first packed data, a decoder, and a functional unit. The decoder has a control signal input. The control signal input is for receiving a first control signal and a second control signal. The first control signal is for indicating a pack operation. The second control signal is for indicating an unpack operation. The functional unit is coupled to the decoder and the register. The functional unit is for performing the pack operation and the unpack operation using the first packed data. The processor also supports a move operation.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

FIG. 5b, FIG. 5c and FIG. 5d illustrate in-register packed data representations.

DESCRIPTION OF THE PREFERRED EMBODIMENT

Overview of One Embodiment of the Present Invention

A processor having move, pack, and unpack operations that operate on multiple data elements is described. In the following description, numerous specific details are set forth such as circuits, etc., in order to provide a thorough understanding of the present invention. In other instances, well-known structures and techniques have not been shown in detail in order not to unnecessarily obscure the present invention.

DEFINITIONS

To provide a foundation for understanding the description of the embodiments of the present invention, the following definitions are provided.

Bit X through Bit Y: defines a subfield of binary number. For example, bit six through bit zero of the byte $00111010_2$ (shown in base two) represent the subfield $111010_2$. The '$_2$' following a binary number indicates base 2. Therefore, $1000_2$ equals $8_{10}$, while $F_{16}$ equals $15_{10}$.

$R_x$: is a register. A register is any device capable of storing and providing data. Further functionality of a register is described below. A register is not necessarily part of the processor's package.

DEST: is a data address.

SRC1: is a data address.

SRC2: is a data address.

Result: is the data to be stored in the register addressed by DEST.

Source1: is the data stored in the register addressed by SRC1.

Source2: is the data stored in the register addressed by SRC2.

Computer System

Figure 1:
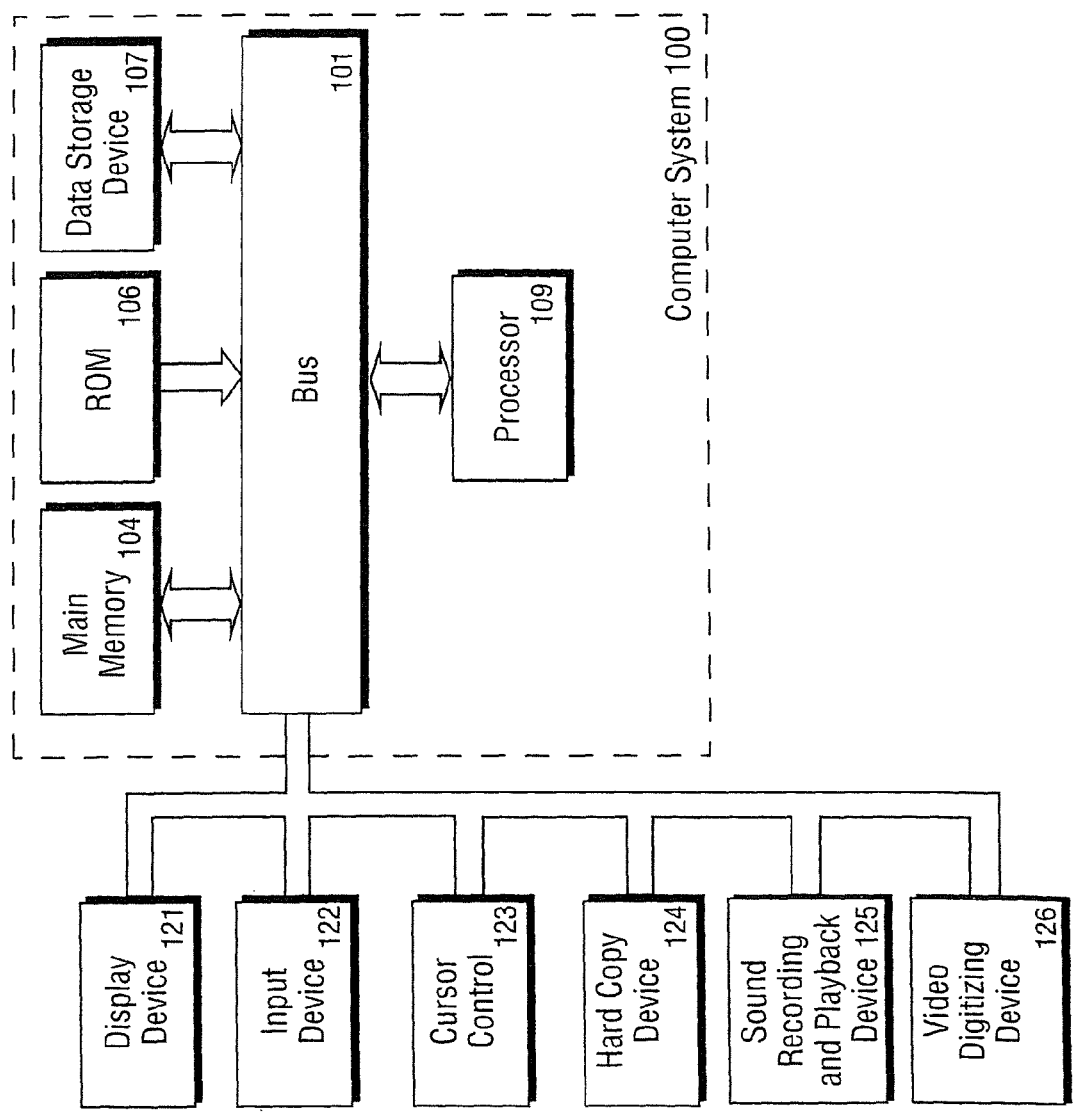
FIG. 1 illustrates an embodiment of the computer system using the methods and apparatus of the present invention.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images that can be transmitted to others on the computer network.

Computer system 100 is useful for supporting computer supported cooperation (CSC—the integration of teleconferencing with mixed media data manipulation), 2D/3D graphics, image processing, video compression/decompression, recognition algorithms and audio manipulation.

Processor

Figure 2:
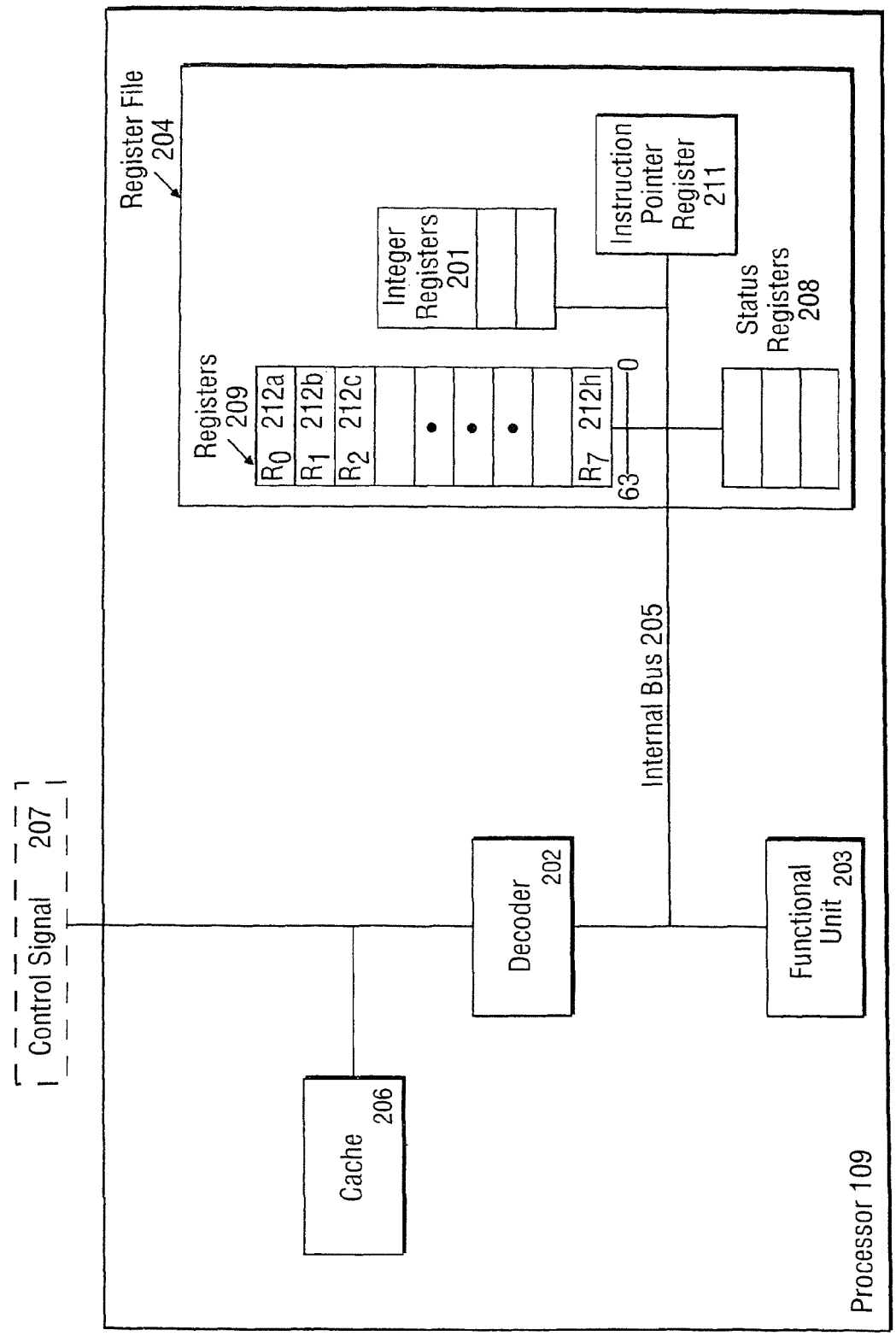
FIG. 2 illustrates an embodiment of the processor of the present invention.

FIG. 2 illustrates a detailed diagram of processor 109. Processor 109 can be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight registers, $R_0$ 212a through $R_7$ 212h. Each register in registers 209 is sixty-four bits in length. $R_1$ 212a, $R_2$ 212b and $R_3$ 212c are examples of individual registers in registers 209. Thirty-two bits of a register in registers 209 can be moved into an integer register in integer registers 201. Similarly, an value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are sixty-four bits in length and integers are represented as sixty-four bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Figure 3:
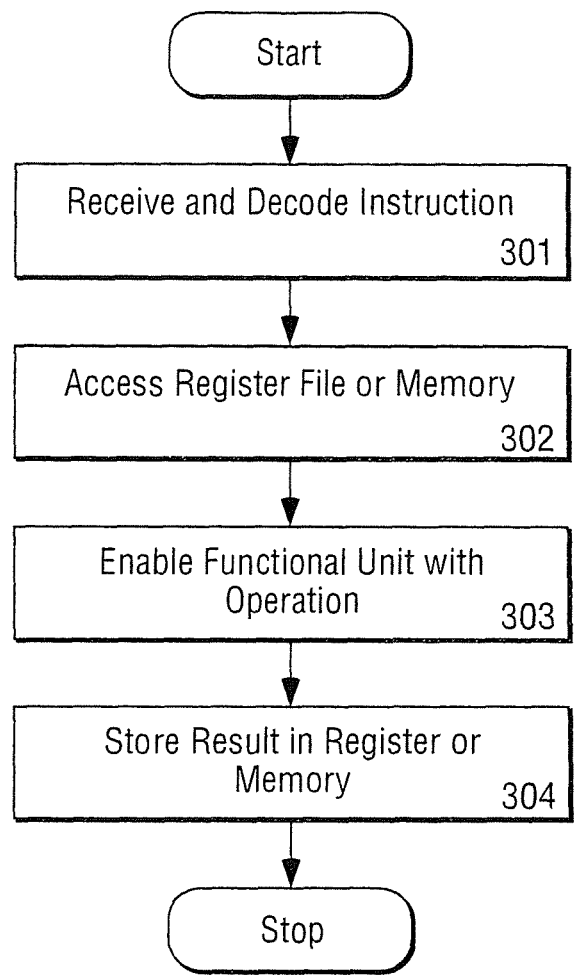
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, read only memory (ROM) 106, or data storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium processor, the Intel 80486™ processor, the 80386™ processor, the Intel 80286™ processor, and the Intel 8086™ processor, all available from Intel Corporation of Santa Clara, Calif. In another embodiment of the present invention, processor 109 supports all the operations supported in the IA™—Intel Architecture, as defined by Intel Corporation of Santa Clara, Calif. (see *Microprocessors*, Intel Data Books volume 1 and volume 2, 1992 and 1993, available from Intel of Santa Clara, Calif.). Generally, processor 109 can support the present instruction set for the Pentium™ processor, but can also be modified to incorporate future instructions, as well as those described herein. What is important is that general processor 109 can support previously used operations in addition to the operations described herein.

At step 301, the decoder 202 receives a control signal 207 from either the cache 206 or bus 101. Decoder 202 decodes the control signal to determine the operations to be performed.

Decoder 202 accesses the register file 204, or a location in memory, at step 302. Registers in the register file 204, or memory locations in the memory, are accessed depending on the register address specified in the control signal 207. For example, for an operation on packed data, control signal 207 can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the present invention, any one, or all, of SRC1, SRC2 and DEST, can define a memory location in the addressable memory space of processor 109. For example, SRC1 may identify a memory location in main memory 104 while SRC2 identifies a first register in integer registers 201, and DEST identifies a second register in registers 209. For simplicity of the description herein, references are made to the accesses to the register file 204, however, these accesses could be made to memory instead.

In another embodiment of the present invention, the operation code only includes two addresses, SRC1 and SRC2. In this embodiment, the result of the operation is stored in the SRC1 or SRC2 register. That is SRC1 (or SRC2) is used as the DEST. This type of addressing is compatible with previous CISC instructions having only two addresses. This reduces the complexity in the decoder 202. Note, in this embodiment, if the data contained in the SRC1 register is not to be destroyed, then that data must first be copied into another register before the execution of the operation. The copying would require an additional instruction. To simplify the description herein, the three address addressing scheme will be described (i.e. SRC1, SRC2, and DEST). However, it should be remembered that the control signal, in one embodiment, may only include SRC1 and SRC2, and that SRC1 (or SRC2) identifies the destination register.

Where the control signal requires an operation, at step 303, functional unit 203 will be enabled to perform this operation on accessed data from register file 204. Once the operation has been performed in functional unit 203, at step 304, the result is stored back into register file 204 according to requirements of control signal 207.

Data and Storage Formats

Figure 4A:
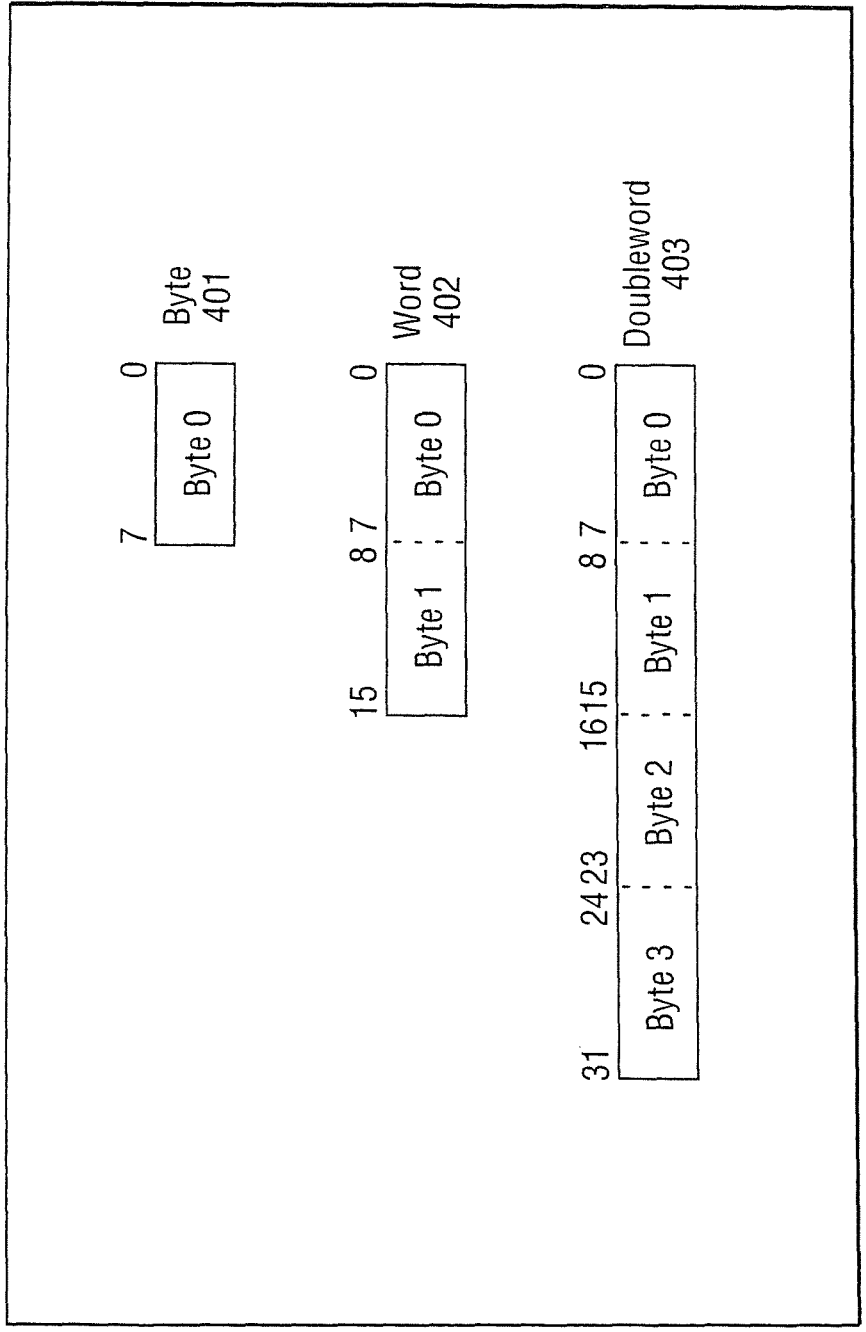
FIG. 4a illustrates memory data types.

FIG. 4a illustrates some of the data formats as may be used in the computer system of FIG. 1. These data formats are fixed point. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte 00111010$_2$ (shown in base 2) represent the subfield 111010$_2$.

Figure 4B:
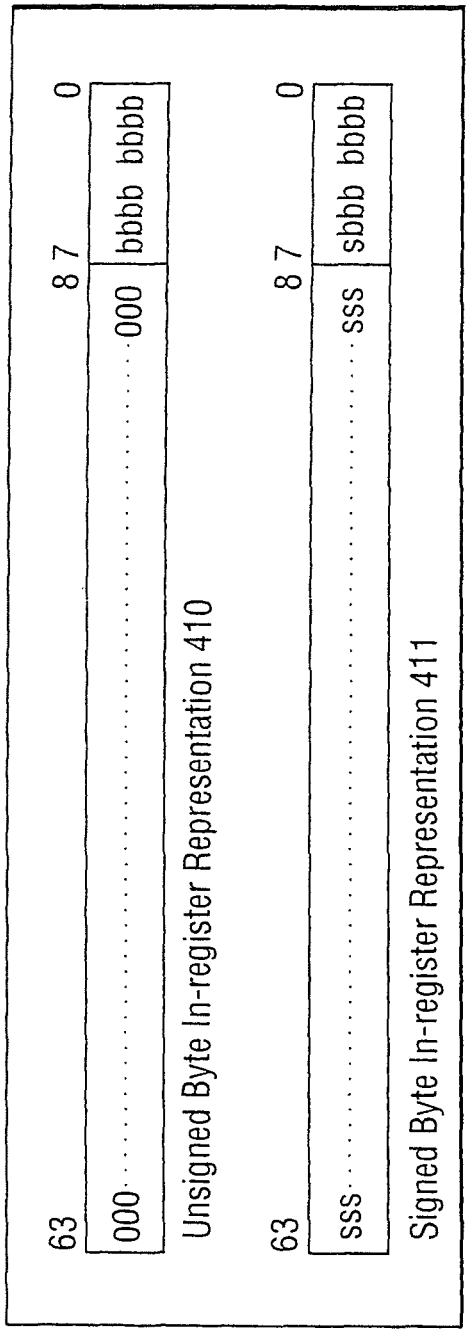
FIG. 4b, FIG. 4c and FIG. 4d illustrate in-register integer data representations.
Figure 4C:
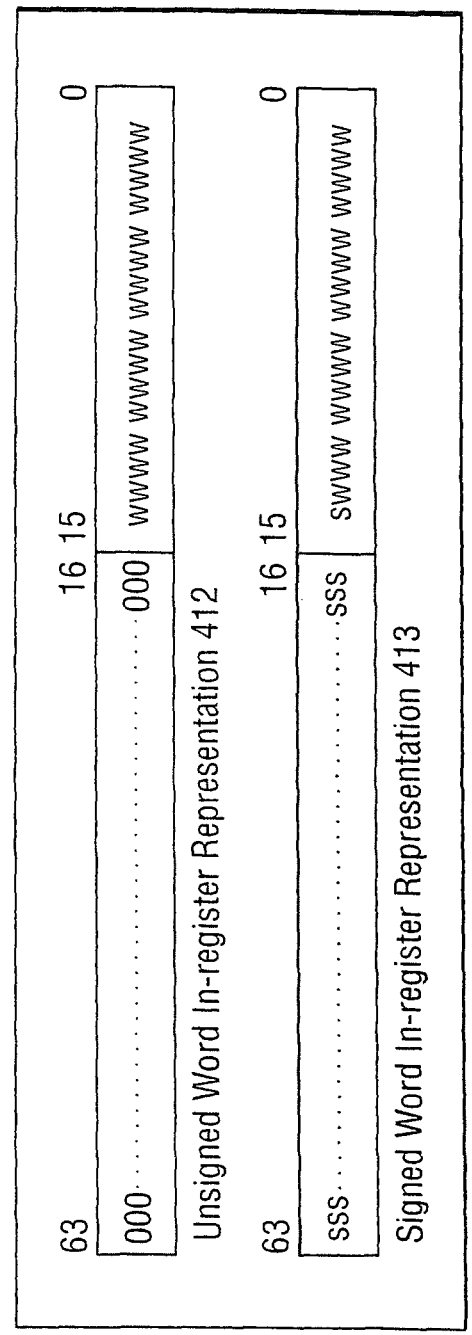
Figure 4D:
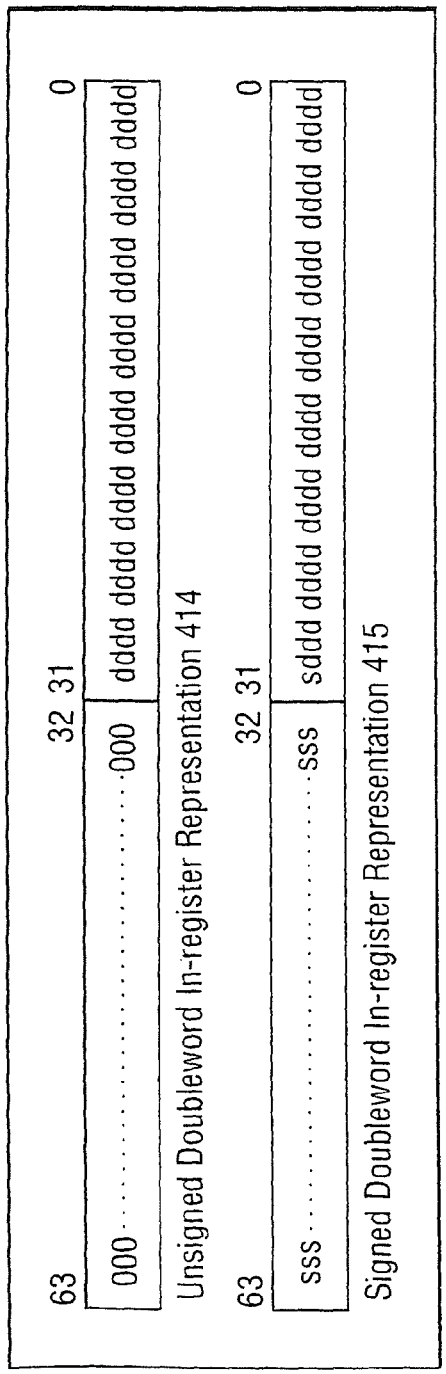

FIG. 4b through FIG. 4d illustrate in-register representations used in one embodiment of the present invention. For example, unsigned byte in-register representation 410 can represent data stored in a register in integer registers 201. In one embodiment, a register, in integer registers 201, is sixty-four bits in length. In another embodiment, a register, in integer registers 201, is thirty-two bits in length. For the simplicity of the description, the following describes sixty-four bit integer registers, however, thirty-two bit integer registers can be used.

Unsigned byte in-register representation 410 illustrates processor 109 storing a byte 401 in integer registers 201, the first eight bits, bit seven through bit zero, in that register are dedicated to the data byte 401. These bits are shown as {b}. To properly represent this byte, the remaining 56 bits must be zero. For an signed byte in-register representation 411, integer registers 201 store the data in the first seven bits, bit six through bit zero, to be data. The seventh bit represents the sign bit, shown as an {s}. The remaining bit sixty-three through bit eight are the continuation of the sign for the byte.

Unsigned word in-register representation 412 is stored in one register of integer registers 201. Bit fifteen through bit zero contain an unsigned word 402. These bits are shown as {w}. To properly represent this word, the remaining bit sixty-three through bit sixteen must be zero. A signed word 402 is stored in bit fourteen through bit zero as shown in the signed word in-register representation 413. The remaining bit sixty-three through bit fifteen is the sign field.

A doubleword 403 can be stored as an unsigned doubleword in-register representation 414 or a signed doubleword in-register representation 415. Bit thirty-one through bit zero of an unsigned doubleword in-register representation 414 are the data. These bits are shown as {d}. To properly represent this unsigned doubleword, the remaining bit sixty-three through bit thirty-two must be zero. Integer registers 201 stores a signed doubleword in-register representation 415 in its bit thirty through bit zero; the remaining bit sixty-three through bit thirty-one are the sign field.

As indicated by the above FIG. 4b through FIG. 4d, storage of some data types in a sixty-four bit wide register is an inefficient method of storage. For example, for storage of an unsigned byte in-register representation 410 bit sixty-three through bit eight must be zero, while only bit seven through bit zero may contain non-zero bits. Thus, a processor storing a byte in a sixty-four bit register uses only 12.5% of the register's capacity. Similarly, only the first few bits of operations performed by functional unit 203 will be important.

Figure 5A:
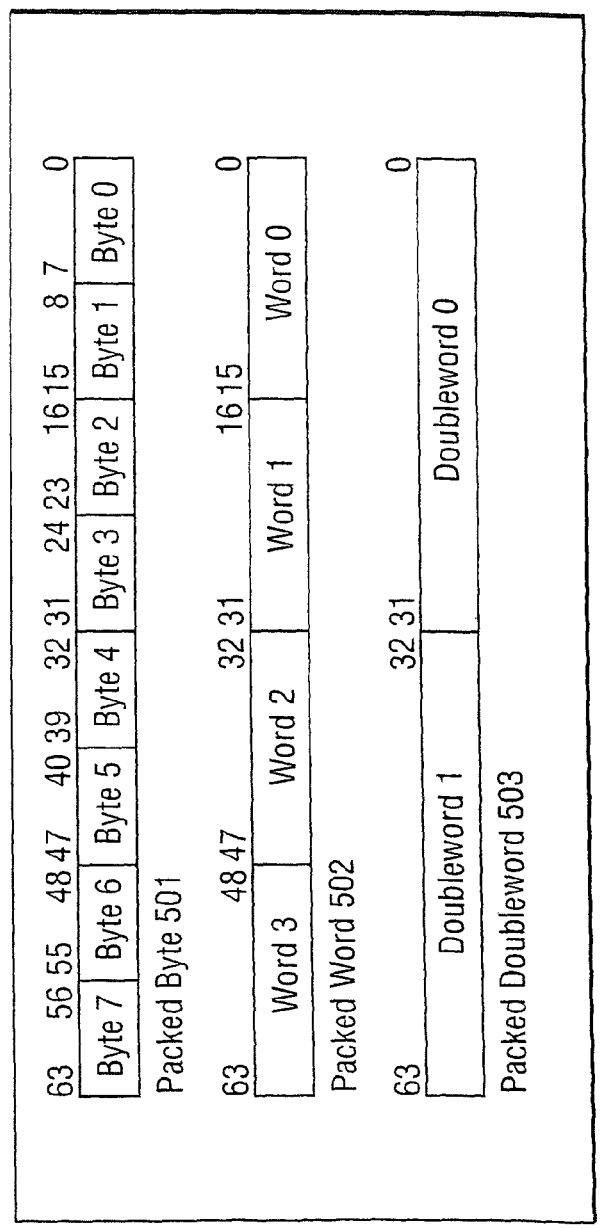
FIG. 5a illustrates packed data types.

FIG. 5a illustrates the data formats for packed data. Each packed data includes more than one independent data element. Three packed data formats are illustrated; packed byte 501, packed word 502, and packed doubleword 503. Packed byte, in one embodiment of the present invention, is sixty-four bits long containing eight data elements. Each data element is one byte long. Generally, a data element is an individual piece of data that is stored in a single register (or memory location) with other data elements of the same length. In one embodiment of the present invention, the number of data elements stored in a register is sixty-four bits divided by the length in bits of a data element.

Packed word 502 is sixty-four bits long and contains four word 402 data elements. Each word 402 data element contains sixteen bits of information.

Packed doubleword 503 is sixty-four bits long and contains two doubleword 403 data elements. Each doubleword 403 data element contains thirty-two bits of information.

FIG. 5b through FIG. 5d illustrate the in-register packed data storage representation. Unsigned packed byte in-register representation 510 illustrates the storage of packed byte 501 in one of the registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 is similarly stored in a register in registers 209. Note that only the eighth bit of every byte data element is the necessary sign bit; other bits may or may not be used to indicate sign.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the necessary sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and integer data. In this embodiment of the present invention, the individual programming processor 109 may be required to track whether an addressed register, $R_1$ 212a for example, is storing packed data or simple integer/fixed point data. In an alternative embodiment, processor 109 could track the type of data stored in individual registers of registers 209. This alternative embodiment could then generate errors if, for example, a packed addition operation were attempted on simple/fixed point integer data.

Control Signal Formats

The following describes one embodiment of control signal formats used by processor 109 to manipulate packed data. In one embodiment of the present invention, control signals are represented as thirty-two bits. Decoder 202 may receive control signal 207 from bus 101. In another embodiment, decoder 202 can also receive such control signals from cache 206.

Figure 6A:
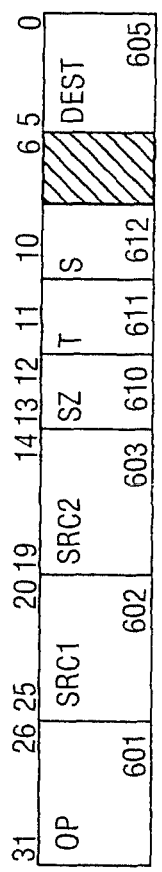
FIG. 6a illustrates a control signal format used in the computer system to indicate the use of packed data.

FIG. 6a illustrates a general format for a control signal operating on packed data. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 501. If SZ 610 equals $10_2$, then the packed data is formatted as packed word 502. SZ 610 equaling $00_2$ or $11_2$ is reserved, however, in another embodiment, one of these values could be used to indicate packed doubleword 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
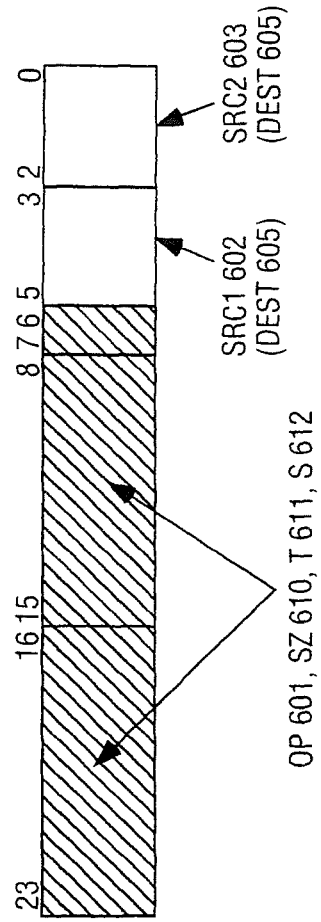
FIG. 6b illustrates a second control signal format that can be used in the computer system to indicate the use of packed data or integer data.

FIG. 6b illustrates a second general format for a control signal operating on packed data This format corresponds with the general integer opcode format described in the "Pentium™ Processor Family User's Manual," available from Intel Corporation, Literature Sales, P.O. Box 7641, Mt. prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium™ Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64} - 1$ |
| Signed Doubleword | $-2^{63}$ | $2^{63} - 1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Data Manipulation Operations

In one embodiment of the present invention, the performance of multimedia applications is improved by not only supporting a standard CISC instruction set (unpacked data operations), but by supporting operations on packed data. Such packed data operations can include an addition, a subtraction, a multiplication, a compare, a shift, an AND, and an XOR. However, to take full advantage of these operations, it has been determined that data manipulation operations should be included. Such data manipulation operations can include a move, a pack, and an unpack. Move, pack and unpack facilitate the execution of the other operations by generating packed data in formats that allow for easier use by programmers.

For further background on the other packed operations, see "A Microprocessor Having a Compare Operation," filed on Dec. 21, 1994, Ser. No. 349,040, "A Microprocessor Having a Multiply Operation," filed on Dec. 1, 1994, Ser. No. 349, 559, "A Novel Processor Having Shift Operations," filed on Dec. 1, 1993, Ser. No. 08/175,772, "A Method and Apparatus Using Packed Data in a Processor," filed on Dec. 30, 1993, Ser. No. 08/176,123, and "A Method and Apparatus Using Novel Operations in a Processor," filed on Dec. 30, 1993, Ser. No. 08/175,772, all assigned to the assignee of the present invention.

Move Operation

The move operation transfers data to or from registers 209. In one embodiment, SRC2 603 is the address containing the source data and DEST 605 is the address where the data is to be transferred. In this embodiment, SRC1 602 would not be used. In another embodiment, SRC1 602 is DEST 605.

For the purposes of the explanation of the move operation, a distinction is drawn between a register and a memory location. Registers are found in register file 204 while memory can be, for example, in cache 206, main memory 104, ROM 106, data storage device 107.

The move operation can move data from memory to registers 209, from registers 209 to memory, and from a register in registers 209 to a second register in registers 209. In one embodiment, packed data is stored in different registers than those used to store integer data. In this embodiment, the move operation can move data from integer registers 201 to registers 209. For example, in processor 109, if packed data is stored in registers 209 and integer data is stored in integer registers 201, then a move instruction can be used to move data from integer registers 201 to registers 209, and vice versa.

In one embodiment, when a memory address is indicated for the move, the eight bytes of data at the memory location (the memory location indicating the least significant byte) are loaded to a register in registers 209 or stored from that register. When a register in registers 209 is indicated, the contents of that register are moved to or loaded from a second register in registers 209. If the integer registers 201 are sixty-four bits in length, and an integer register is specified, then the eight bytes of data in that integer register are loaded to a register in registers 209 or stored from that register.

In one embodiment, integers are represented as thirty-two bits. When a move operation is performed from registers 209 to integer registers 201, then only the low thirty-two bits of the packed data are moved to the specified integer register. In one embodiment, the high order thirty-two bits are zeroed. Similarly, only the low thirty-two bits of a register in registers 209 are loaded when a move, is executed from integer registers 201 to registers 209. In one embodiment, processor 109 supports a thirty-two bit move operation between a register in registers 209 and memory. In another embodiment, a move of only thirty-two bits is performed on the high order thirty-two bits of packed data.

Pack Operation

In one embodiment of the present invention, the SRC1 602 register contains data (Source1), the SRC2 603 register contains the data (Source2), and DEST 605 register will contain the result data (Result) of the operation. That is, parts of Source1 and parts of Source2 will be packed together to generate Result.

In one embodiment, a pack operation converts packed words (or doublewords) into packed bytes (or words) by packing the low order bytes (or words) of the source packed words (or doublewords) into the bytes (or words) of the Result. In one embodiment, the pack operation converts quad packed words into packed doublewords. This operation can be optionally performed with signed data. Further, this operation can be optionally performed with saturate.

Figure 7:
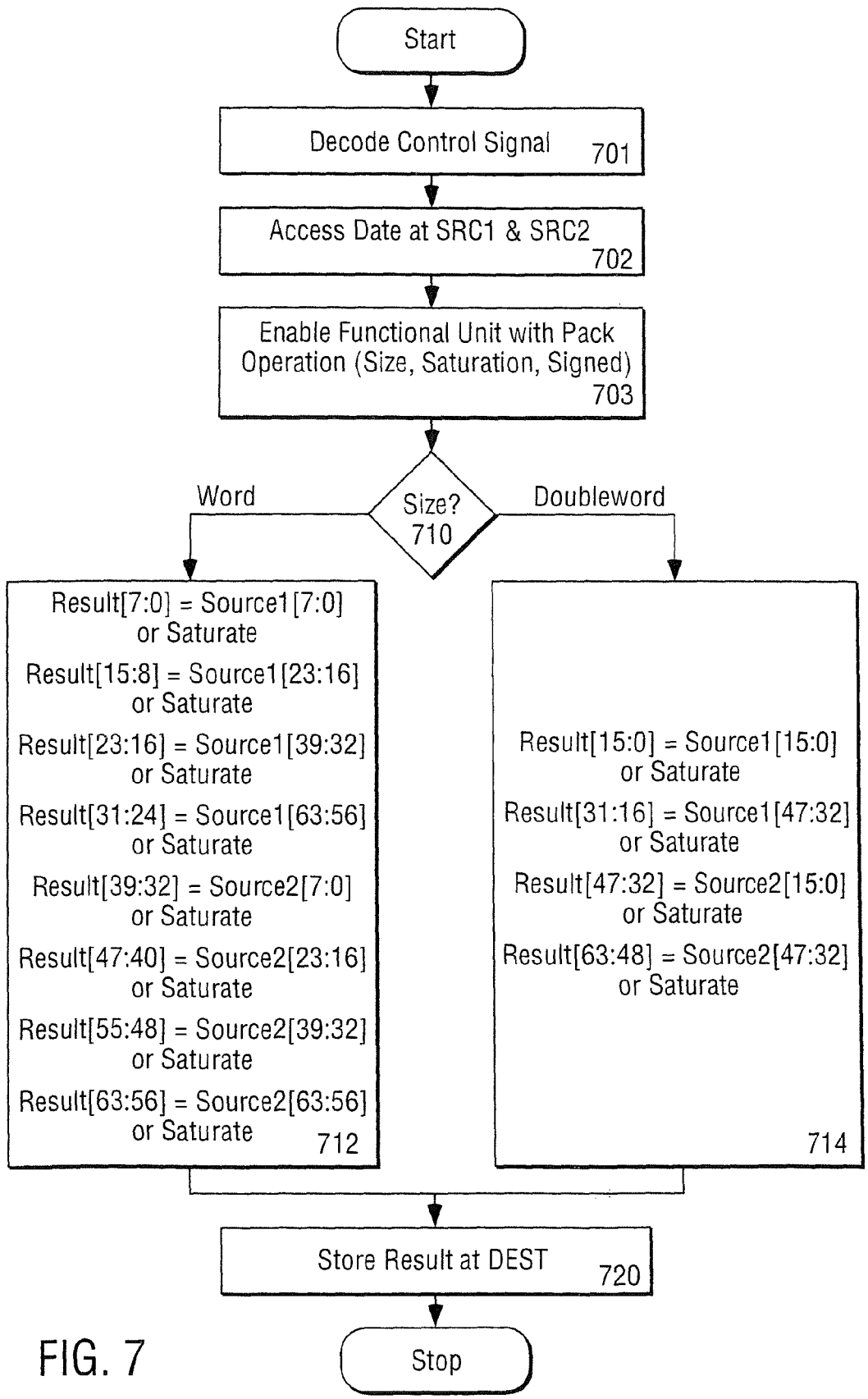
FIG. 7 illustrates one embodiment of a method followed by a processor when performing a pack operation on packed data.

FIG. 7 illustrates one embodiment of a method of performing a pack operation on packed data. This embodiment can be implemented in the processor 109 of FIG. 2.

At step 701, decoder 202 decodes control signal 207 received by processor 109. Thus, decoder 202 decodes: the operation code for the appropriate pack operation; SRC1 602, SRC2 603 and DEST 605 addresses in registers 209; saturate/unsaturate, signed/unsigned, and length of the data elements in the packed data. As mentioned previously, SRC1 602 (or SRC2 603) can be used as DEST 605.

At step 702, via internal bus 205, decoder 202 accesses registers 209 in register file 204 given the SRC1 602 and SRC2 603 addresses. Registers 209 provides functional unit 203 with the packed data stored in the SRC1 602 register (Source1), and the packed data stored in SRC2 603 register (Source2). That is, registers 209 communicate the packed data to functional unit 203 via internal bus 205.

At step 703, decoder 202 enables functional unit 203 to perform the appropriate pack operation. Decoder 202 further communicates, via internal bus 205, saturate and the size of the data elements in Source1 and Source2. Saturate is optionally used to maximize the value of the data in the result data element. If the value of the data elements in Source1 or Source2 are greater than or less than the range of values that the data elements of Result can represent, then the corresponding result data element is set to its highest or lowest value. For example, if signed values in the word data elements of Source1 and Source2 are smaller than 0x80 (or 0x8000 for doublewords), then the result byte (or word) data elements are clamped to 0x80 (or 0x8000 for doublewords). If signed values in word data elements of Source1 and Source2 are greater than 0x7F (or 0x7FFF for doublewords), then the result byte (or word) data elements are clamped to 0x7F (or 0x7FFF).

At step 710, the size of the data element determines which step is to be executed next. If the size of the data elements is sixteen bits (packed word 502 data), then functional unit 203 performs step 712. However, if the size of the data elements in the packed data is thirty-two bits (packed doubleword 503 data), then functional unit 203 performs step 714.

Assuming the size of the source data elements is sixteen bits, then step 712 is executed. In step 712, the following is performed. Source1 bits seven through zero are Result bits seven through zero. Source1 bits twenty-three through sixteen are Result bits fifteen through eight. Source1 bits thirty-nine through thirty-two are Result bits twenty-three through sixteen. Source1 bits sixty-three through fifty-six are Result bits thirty-one through twenty-four. Source2 bits seven through zero are Result bits thirty-nine through thirty-two. Source2 bits twenty-three through sixteen are Result bits forty-seven through forty. Source2 bits thirty-nine through thirty-two are Result bits fifty-five through forty-eight. Source2 bits sixty-three through fifty-six are Result bits thirty-one through twenty-four. If saturate is set, then the high order bits of each word are tested to determine whether the Result data element should be clamped.

Assuming the size of the source data elements is thirty-two bits, then step 714 is executed. In step 714, the following is performed. Source1 bits fifteen through zero are Result bits fifteen through zero. Source1 bits forty-seven through thirty-two are Result bits thirty-one through sixteen. Source2 bits fifteen through zero are Result bits forty-seven through thirty-two. Source2 bits forty-seven through thirty-two are Result bits sixty-three through forty-eight. If saturate is set, then the high order bits of each doubleword are tested to determine whether the Result data element should be clamped.

In one embodiment, the packing of step 712 is performed simultaneously. However, in another embodiment, this packing is performed serially. In another embodiment, some of the packing is performed simultaneously and some is performed serially. This discussion also applies to the packing of step 714.

At step 720, the Result is stored in the DEST 605 register.

Table 2 illustrates the in-register representation of a pack unsigned word operation with no saturation. The first row of bits is the packed data representation of Source1. The second row of bits is the data representation of Source2. The third row of bits is the packed data representation of the Result. The number below each data element bit is the data element number. For example, Source1 data element three is $10000000_2$.

TABLE 2

| Source1 | | | | | | | |
|---|---|---|---|---|---|---|---|
| 00101010 | 01010101 | 01010101 | 11111111 | 10000000 | 01110000 | 10001111 | 10001000 |
| | 3 | | 2 | | 1 | | 0 |

| Source2 | | | | | | | |
|---|---|---|---|---|---|---|---|
| 00000000 | 00000000 | 11000000 | 00000000 | 11110011 | 00000000 | 10001110 | 100010001 |
| | 3 | | 2 | | 1 | | 0 |

| Result | | | | | | | |
|---|---|---|---|---|---|---|---|
| 00000000 | 00000000 | 00000000 | 10001000 | 01010101 | 11111111 | 01110000 | 10001000 |
| 7 | 6 | 5 | 4 | 3 | 2 | 1 | 0 |

Table 3 illustrates the in-register representation of pack signed doubleword operation with saturation.

TABLE 3

| Source1 | | | | | | | |
|---|---|---|---|---|---|---|---|
| 00101010 | 01010101 | 01010101 | 11111111 | 10000000 | 01110000 | 10001111 | 10001000 |
| | | | 1 | | | | 0 |
| Source2 | | | | | | | |
| 00000000 | 00000000 | 11000000 | 00000000 | 11110011 | 00000000 | 10001110 | 10001000 |
| | | | 1 | | | | 0 |
| Result | | | | | | | |
| 11000000 | 00000000 | 10000000 | 00000000 | 01111111 | 11111111 | 10000000 | 00000000 |
| | 3 | | 2 | | 1 | | 0 |

Pack Circuits

Figure 8A:
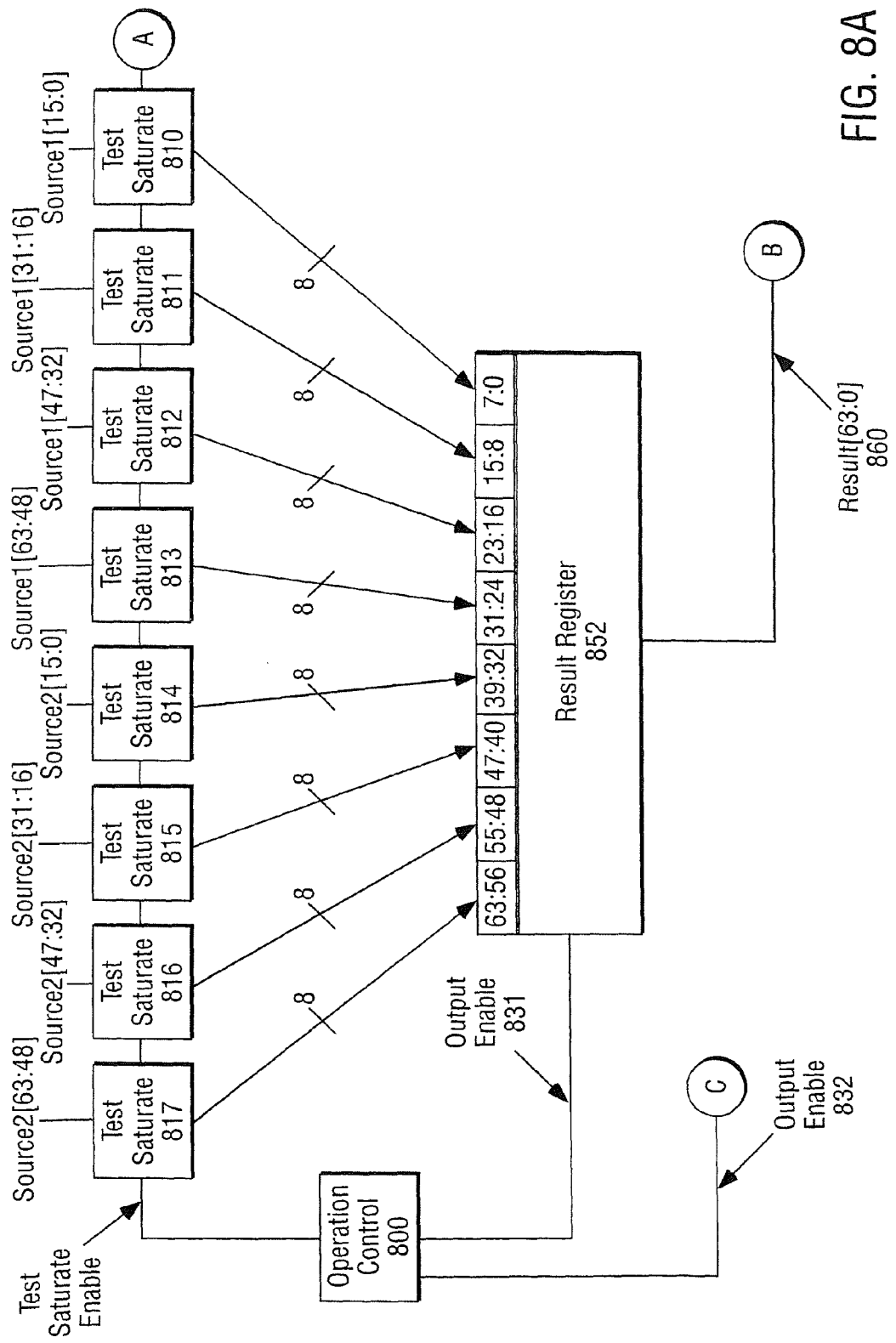
FIG. 8a illustrates a circuit capable of implementing a pack operation on packed byte data.
Figure 8B:
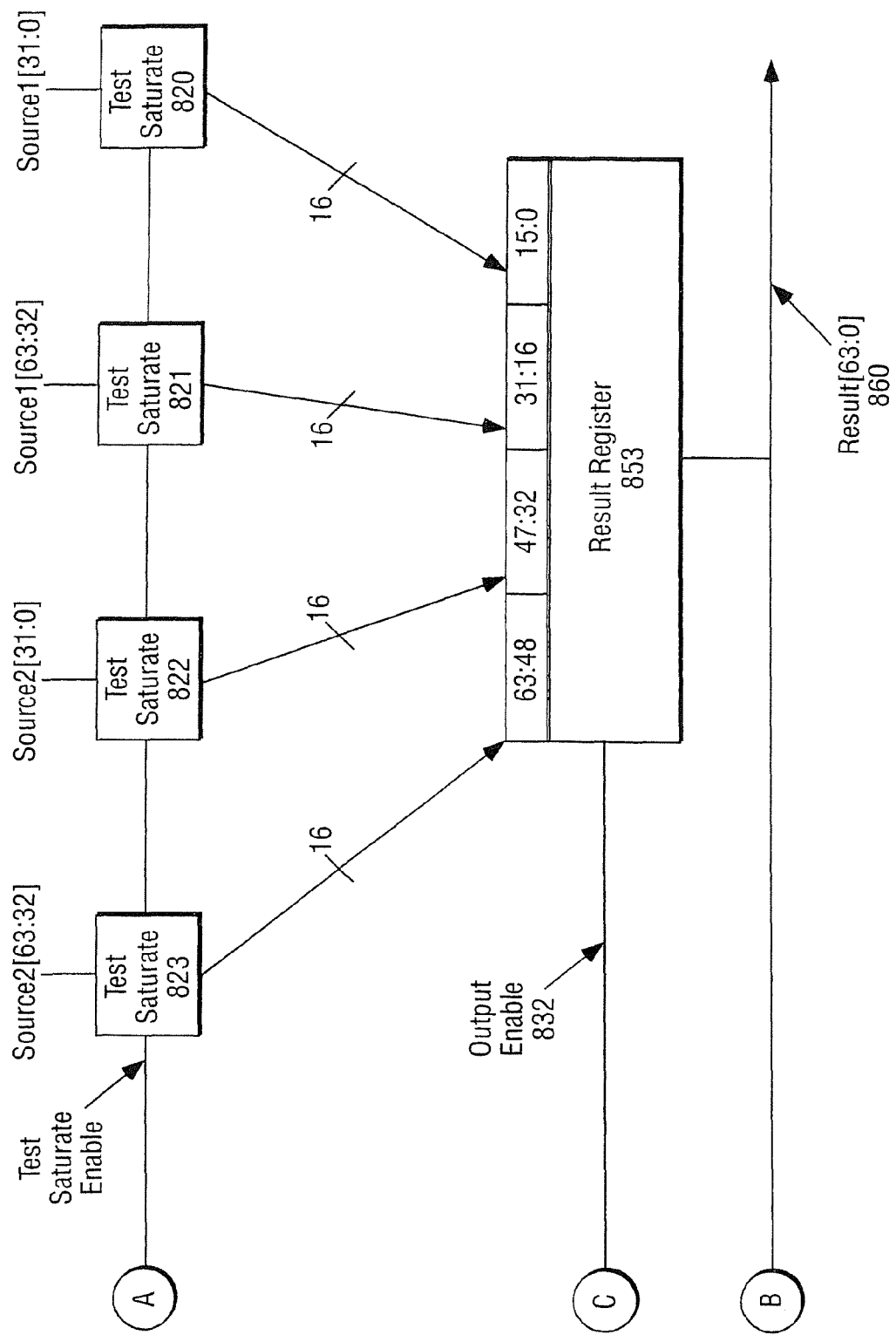
FIG. 8b illustrates a circuit capable of implementing a pack operation on packed word data.

In one embodiment of the present invention, to achieve efficient execution of the pack operation parallelism is used. FIGS. 8*a* and 8*b* illustrate one embodiment of a circuit that can perform a pack operation on packed data. The circuit can optionally perform the pack operation with saturation.

The circuit of FIGS. 8*a* and 8*b* includes an operation control circuit 800, a result register 852, a result register 853, eight sixteen bit to eight bit test saturate circuits, and four thirty-two bit to sixteen bit test saturate circuits.

Operation control 800 receives information from the decoder 202 to enable a pack operation. Operation control 800 uses the saturate value to enable the saturation tests for each of the test saturate circuits. If the size of the source packed data is word packed data 503, then output enable 831 is set by operation control 800. This enables the output of output register 852. If the size of the source packed data is doubleword packed data 504, then output enable 832 is set by operation control 800. This enables the output of output register 853.

Each test saturate circuit can selectively test for saturation. If a test for saturation is disabled, then each test saturate circuit merely passes the low order bits through to a corresponding position in a result register. If a test for saturate is enabled, then each test saturate circuit tests the high order bits to determine if the result should be clamped.

Test saturate 810 through test saturate 817 have sixteen bit inputs and eight bit outputs. The eight bit outputs are the lower eight bits of the inputs, or optionally, are a clamped value (0x80, 0x7F, or 0xFF). Test saturate 810 receives Source1 bits fifteen through zero and outputs bits seven through zero for result register 852. Test saturate 811 receives Source1 bits thirty-one through sixteen and outputs bits fif-teen through eight for result register 852. Test saturate 812 receives Source1 bits forty-seven seven through thirty-two and outputs bits twenty-three through sixteen for result register 852. Test saturate 813 receives Source1 bits sixty-three through forty-eight and outputs bits thirty-one through twenty-four for result register 852. Test saturate 814 receives Source2 bits fifteen through zero and outputs bits thirty-nine through thirty-two for result register 852. Test saturate 815 receives Source2 bits thirty-one through sixteen and outputs bits forty-seven through forty for result register 852. Test saturate 816 receives Source2 bits forty-seven through thirty-two and outputs bits fifty-five through forty-eight for result register 852. Test saturate 817 receives Source2 bits sixty-three through forty-eight and outputs bits sixty-three through fifty-six for result register 852.

Test saturate 820 through test saturate 823 have thirty-two bit inputs and sixteen bit outputs. The sixteen bit outputs are the lower sixteen bits of the inputs, or optionally, are a clamped value (0x8000, 0x7FFF, or 0xFFFF). Test saturate 820 receives Source1 bits thirty-one through zero and outputs bits fifteen through zero for result register 853. Test saturate 821 receives Source1 bits sixty-three through thirty-two and outputs bits thirty-one through sixteen for result register 853. Test saturate 822 receives Source2 bits thirty-one through zero and outputs bits forty-seven through thirty-two for result register 853. Test saturate 823 receives Source2 bits sixty-three through thirty-two and outputs bits sixty-three though forty-eight of result register 853.

For example, in Table 4, a pack word unsigned with no saturate is performed. Operation control 800 will enable result register 852 to output result[63:0] 860.

TABLE 4

| Source1 | | | | | | | |
|---|---|---|---|---|---|---|---|
| ... | | ... | | 00001110 | 01110000 | 00001110 | 00001000 |
| | 3 | | | 2 | 1 | | 0 |
| Source2 | | | | | | | |
| | | | | 00001110 | 10000001 | 00001110 | 10000001 |
| | 3 | | | 2 | 1 | | 0 |
| Result | | | | | | | |
| ... | ... | 10000001 | 10000001 | ... | ... | 01110000 | 00001000 |
| 7 | 6 | 5 | 4 | 3 | 2 | 1 | 0 |

However, if a pack doubleword unsigned with no saturate is performed, operation control 800 will enable result register 853 to output result[63:0] 860. Table 5 illustrates this result.

TABLE 5

| | | | Source1 | | | |
|---|---|---|---|---|---|---|
| ... | ... | 00001110 | 01000001 | 00001110 | 00001000 | |
| | 1 | | | | 0 | |
| | | | Source2 | | | |
| ... | ... | 00001110 | 00000001 | 00001110 | 10000001 | |
| | 1 | | | | 0 | |
| | | | Result | | | |
| ... | 00001110 | 10000001 | ... | 00001110 | 00001000 | |
| 3 | | 2 | 1 | | 0 | |

Unpack Operation

In one embodiment, an unpack operation interleaves the low order packed bytes, words or doublewords of two source packed data to generate result packed bytes, words, or doublewords.

Figure 9:
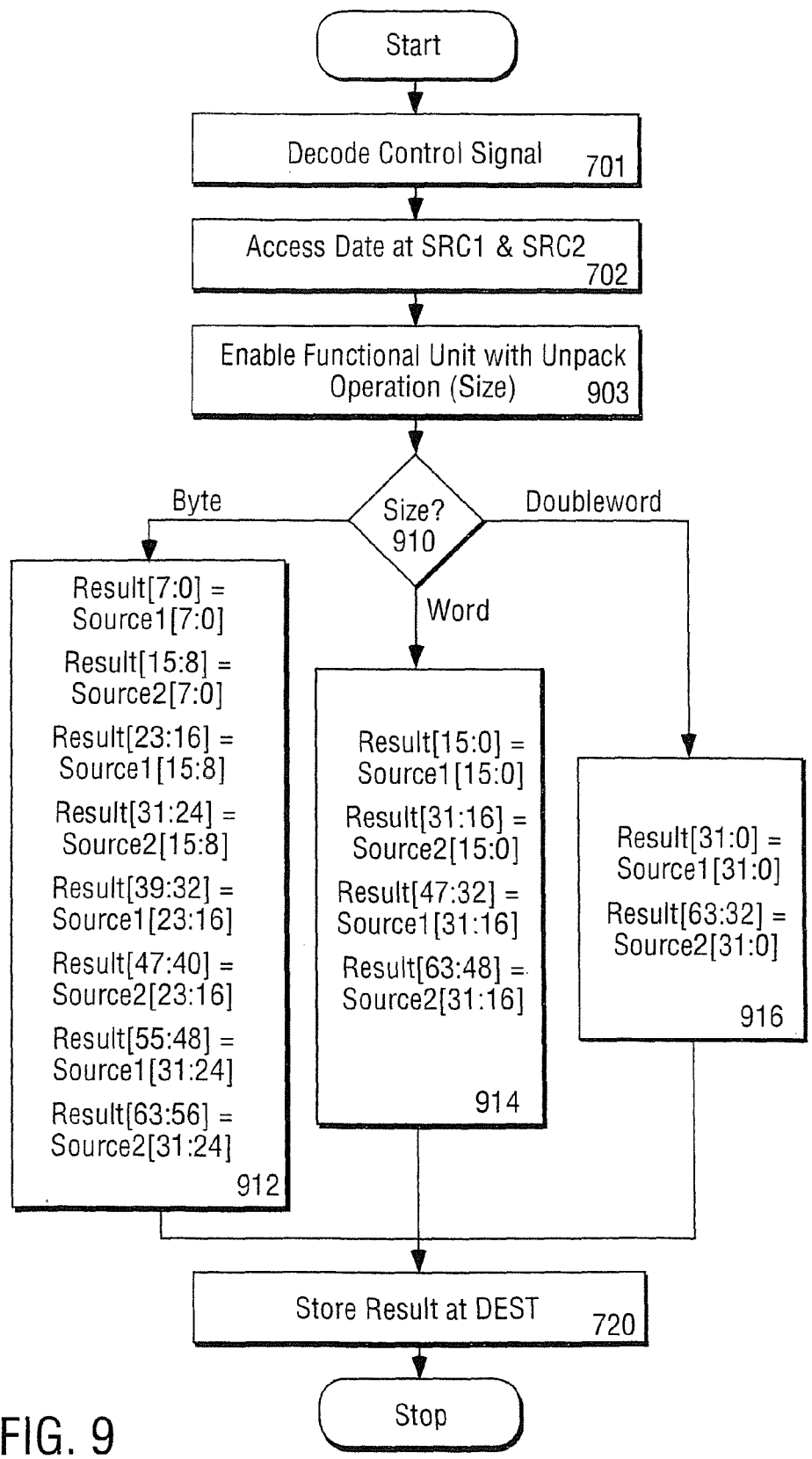
FIG. 9 illustrates on embodiment of a method followed by a processor when performing an unpack operation on packed data.

FIG. 9 illustrates one embodiment of a method of performing an unpack operation on packed data. This embodiment can be implemented in the processor 109 of FIG. 2.

Step 701 and step 702 are executed first. At step 903, decoder 202 enables functional unit 203 to perform the unpack operation. Decoder 202 communicates, via internal bus 205, the size of the data elements in Source1 and Source2.

At step 910, the size of the data element determines which step is to be executed next. If the size of the data elements is eight bits (packed byte 501 data), then functional unit 203 performs step 712. However, if the size of the data elements in the packed data is sixteen bits (packed word 502 data), then functional unit 203 performs step 714. However, if the size of the data elements in the packed data is thirty-two bits (packed doubled word 503 data), then functional unit 203 performs step 716.

Assuming the size of the source data elements is eight bits, then step 712 is executed. In step 712, the following is performed. Source1 bits seven through zero are Result bits seven through zero. Source2 bits seven through zero are Result bits fifteen through eight. Source1 bits fifteen through eight are Result bits twenty-three through sixteen. Source2 bits fifteen through eight are Result bits thirty-one through twenty-four. Source1 bits twenty-three through sixteen are Result bits thirty-nine through thirty-two. Source2 bits twenty-three through sixteen are Result bits forty-seven through forty. Source1 bits thirty-one through twenty-four are Result bits fifty-five through forty-eight. Source2 bits thirty-one through twenty-four are Result bits sixty-three through fifty-six.

Assuming the size of the source data elements is sixteen bits, then step 714 is executed. In step 714, the following is performed. Source1 bits fifteen through zero are Result bits fifteen through zero. Source2 bits fifteen through zero are Result bits thirty-one through sixteen. Source1 bits thirty-one through sixteen are Result bits forty-seven through thirty-two. Source2 bits thirty-one through sixteen are Result bits sixty-three through forty-eight.

Assuming the size of the source data elements is thirty-two bits, then step 716 is executed. In step 716, the following is performed. Source1 bits thirty-one through zero are Result bits thirty-one through zero. Source2 bits thirty-one through zero are Result bits sixty-three through thirty-two.

In one embodiment, the unpacking of step 712 is performed simultaneously. However, in another embodiment, this unpacking is performed serially. In another embodiment, some of the unpacking is performed simultaneously and some is performed serially. This discussion also applies to the unpacking of step 714 and step 716.

At step 720, the Result is stored in the DEST 605 register.

Table 6 illustrates the in-register representation of an unpack byte operation.

TABLE 6

| | | | Source1 | | | | |
|---|---|---|---|---|---|---|---|
| 00101010 | 01010101 | 01010101 | 11111111 | 10000000 | 01110000 | 10001111 | 10001000 |
| 7 | 6 | 5 | 4 | 3 | 2 | 1 | 0 |
| | | | Source2 | | | | |
| 00000000 | 00000000 | 11000000 | 00000000 | 11110011 | 00000000 | 10001110 | 10001000 |
| 7 | 6 | 5 | 4 | 3 | 2 | 1 | 0 |
| | | | Result | | | | |
| 11110011 | 10000000 | 00000000 | 01110000 | 10001110 | 10001111 | 10001000 | 10001000 |
| 7 | 6 | 5 | 4 | 3 | 2 | 1 | 0 |

Table 7 illustrates the in-register representation of an unpack word operation.

TABLE 7

| | | Source1 | | | | |
|---|---|---|---|---|---|---|
| 00101010 | 01010101 | 01010101 | 11111111 | 10000000 | 01110000 | 10001111 | 10001000 |
| | 3 | | 2 | | 1 | | 0 |

TABLE 7-continued

| Source2 | | | | | | | |
|---|---|---|---|---|---|---|---|
| 00000000 | 00000000 | 11000000 | 00000000 | 11110011 | 00000000 | 10001110 | 10001000 |
| | 3 | | 2 | | 1 | | 0 |
| Result | | | | | | | |
| 11110011 | 00000000 | 10000000 | 01110000 | 10001110 | 10001000 | 10001111 | 10001000 |
| | 3 | | 2 | | 1 | | 0 |

Table 8 illustrates the in-register representation of an unpack doubleword operation.

TABLE 8

| Source1 | | | | | | | |
|---|---|---|---|---|---|---|---|
| 00101010 | 01010101 | 01010101 | 11111111 | 10000000 | 01110000 | 10001111 | 10001000 |
| | | | 1 | | | | 0 |
| Source2 | | | | | | | |
| 00000000 | 00000000 | 11000000 | 00000000 | 11110011 | 00000000 | 10001110 | 10001000 |
| | | | 1 | | | | 0 |
| Result | | | | | | | |
| 11110011 | 00000000 | 10001110 | 10001000 | 10000000 | 01110000 | 10001111 | 10001000 |
| | | | 1 | | | | 0 |

Unpack Circuits

Figure 10:
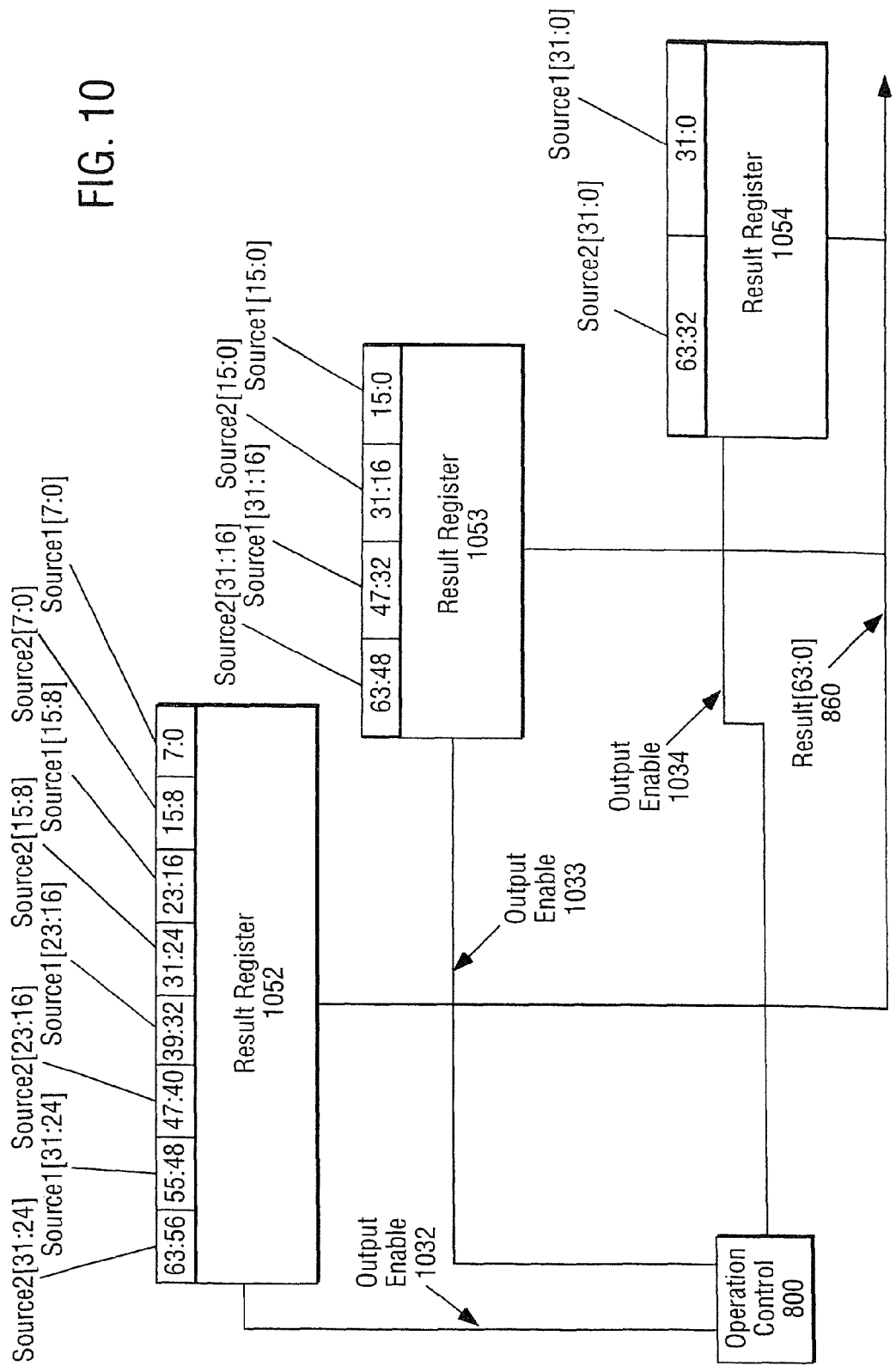
FIG. 10 illustrates a circuit capable of implementing an unpack operation on packed data.

In one embodiment of the present invention, to achieve efficient execution of the unpack operation parallelism is used FIG. 10 illustrates one embodiment of a circuit that can perform an unpack operation on packed data.

The circuit of FIG. 10 includes the operation control circuit 800, a result register 1052, a result register 1053, and a result register 1054.

Operation control 800 receives information from the decoder 202 to enable an unpack operation. If the size of the source packed data is byte packed data 502, then output enable 1032 is set by operation control 800. This enables the output of result register 1052. If the size of the source packed data is word packed data 503, then output enable 1033 is set by operation control 800. This enables the output of output register 1053. If the size of the source packed data is doubleword packed data 504, then output enable 1034 is set by operation control 800. This enables the output of output result register 1054.

Result register 1052 has the following inputs. Source1 bits seven through zero are bits seven through zero for result register 1052. Source2 bits seven through zero are bits fifteen through eight for result register 1052. Source1 bits fifteen through eight are bits twenty-three through sixteen for result register 1052. Source2 bits fifteen through eight are bits thirty-one through twenty-four for result register 1052.

Source1 bits twenty-three through sixteen are bits thirty-nine through thirty-two for result register 1052. Source2 bits twenty-three through sixteen are bits forty-seven through forty for result register 1052. Source1 bits thirty-one through twenty-four are bits fifty-five through forty-eight for result register 1052. Source2 bits thirty-one through twenty-four are bits sixty-three through fifty-six for result register 1052.

Result register 1053 has the following inputs. Source1 bits fifteen through zero are bits fifteen through zero for result register 1053. Source2 bits fifteen through zero are bits thirty-one through sixteen for result register 1053. Source1 bits thirty-one through sixteen are bits forty-seven through thirty-two for result register 1053. Source2 bits thirty-one through sixteen are bits sixty-three though forty-eight of result register 853.

Result register 1054 has the following inputs. Source1 bits thirty-one through zero are bits thirty-one through zero for result register 1054. Source2 bits thirty-one through zero are bits sixty-three through thirty-two of result register 1054.

For example, in Table 9, an unpack word operation is performed. Operation control 800 will enable result register 1053 to output result[63:0] 860.

TABLE 9

| Source1 | | | | | | | |
|---|---|---|---|---|---|---|---|
| | ... | | ... | 00001110 | 01110000 | 00001110 | 00001000 |
| | 3 | | 2 | | 1 | | 0 |
| Source2 | | | | | | | |
| | ... | | ... | 00001110 | 00000001 | 00001110 | 10000001 |
| | 3 | | 2 | | 1 | | 0 |
| Result | | | | | | | |
| 00001110 | 00000001 | 00001110 | 01110000 | 00001110 | 10000001 | 00001110 | 00001000 |
| | 3 | | 2 | | 1 | | 0 |

However, if an unpack doubleword is performed, operation control 800 will enable result register 1054 to output result [63:0] 860. Table 10 illustrates this result.

TABLE 10

| Source1 | | | | |
|---|---|---|---|---|
| ...11 | 00001110 | 01000001 | 00001110 | 000010000 |

| Source2 | | | | |
|---|---|---|---|---|
| ...11 | 00001110 | 00000001 | 00001110 | 100000010 |

| Result | | | | | | | |
|---|---|---|---|---|---|---|---|
| 00001110 | 00000001 | 00001110 | 100000011 | 00001110 | 01000001 | 00001110 | 000010000 |

Therefore, the move, pack and unpack operations can manipulate multiple data elements. In prior art processors, to perform these types of manipulations, multiple separate operations would be needed to perform a single packed move, pack or unpack operation. The data lines for the packed data operations, in one embodiment, all carry relevant data. This leads to a higher performance computer system.

What is claimed is:

1. A processor including:
   a plurality of packed data registers including a first register to store a first packed data a second register to store a second packed data, a third register to store a third packed data, and a fourth register to store a fourth packed data;
   a decoder to receive a first control signal that is to indicate the first register and the second register as source operands, and a second control signal that is to indicate the third register and the fourth register as source operands, said first control signal to indicate a pack operation, said second control signal to indicate an unpack operation;
   at least one functional unit being coupled to said decoder and said plurality of packed data registers, said at least one functional unit to perform said pack operation and said unpack operation, said pack operation to cause a result to be stored in which all data elements from the first and second packed data are represented by half as many bits as in the first and second packed data, said unpack operation to cause a result to be stored in which half of data elements of the third packed data are interleaved with half of data elements of the fourth packed data.

2. The processor of claim 1 wherein said first packed data includes a plurality of data elements, each data element of said plurality of data elements has a size, and said first control signal further includes an indicator corresponding to said size.

3. The processor of claim 2 wherein said size is one of packed byte, packed word, and packed doubleword.

4. The processor of claim 2 where said first packed data is sixty-four bits.

5. The processor of claim 1 wherein said first control signal includes a sign indicator, said sign indicator to determine whether said pack operation is to be performed signed or unsigned.

6. The processor of claim 1 wherein said decoder is further to receive a third control signal, said third control signal to indicate a move operation, wherein said move operation is to cause said processor to move data between two registers.

7. A processor comprising:
   a register file having a plurality of registers;
   a decoder coupled with the register file, the decoder to decode a first instruction, the first instruction to have a 32-bit instruction format, the first instruction to have a first field to specify a first source register of the register file that is to have a first plurality of packed signed 16-bit integers and a second field to specify a second source register of the register file that is to have a second plurality of packed signed 16-bit integers; and
   a unit coupled with the decoder, the unit to generate a result according to the first instruction that is to be stored in a destination register that is to be specified by a third field of the first instruction, the result to include a third plurality of packed 8-bit integers,
   the third plurality of the packed 8-bit integers to include an 8-bit integer for each 16-bit integer in the first plurality of the packed signed 16-bit integers, and an 8-bit integer for each 16-bit integer in the second plurality of the packed signed 16-bit integers,
   the 8-bit integers corresponding to the first plurality of the packed signed 16-bit integers to be next to one another in the result, and the 8-bit integers corresponding to the second plurality of the packed signed 16-bit integers to be next to one another in the result,
   a highest order 8-bit integer of the result to correspond to a highest order 16-bit integer of the first plurality of the packed signed 16-bit integers, and a lowest order 8-bit integer of the result to correspond to a lowest order 16-bit integer of the second plurality of the packed signed 16-bit integers, and
   each 8-bit integer of the third plurality of the packed 8-bit integers to include one of (a) a low order 8-bits of a corresponding 16-bit integer and (b) a saturation value,
   wherein the decoder is also to decode a second instruction that is to cause the processor to store only half of a plurality of data elements from a first source operand indicated by the second instruction and only half of a plurality of data elements from a second source operand indicated by the second instruction to a destination.

8. The processor of claim 7, wherein if a 16-bit integer of the first source register has a value greater than 255 the unit is to set a corresponding 8-bit integer of the result to the saturation value of 255, and wherein if a 16-bit integer of the first source register has a value less than 0 the unit is to set a corresponding 8-bit integer of the result to the saturation value of 0.

9. The processor of claim 7, wherein a next highest order 8-bit integer of the result corresponds to a next highest order 16-bit integer of the first plurality of the packed signed 16-bit integers, and wherein a next lowest order 8-bit integer of the result corresponds to a next lowest order 16-bit integer of the second plurality of the packed signed 16-bit integers.

10. The processor of claim 7, wherein the processor recognizes a plurality of other packed data operations including at least a packed data addition operation, a packed data subtraction operation, a packed data multiplication operation, and a packed data shift operation.

11. A system comprising:
a bus;
a touch screen display coupled with the bus;
a device coupled with the bus to capture video images;
a processor coupled with the bus, the processor comprising:
a register file having a plurality of registers;
a decoder coupled with the register file, the decoder to decode a first instruction, the first instruction to have a first field to specify a first source register of the register file that is to have a first plurality of packed signed 16-bit integers and a second field to specify a second source register of the register file that is to have a second plurality of packed signed 16-bit integers; and
a unit coupled with the decoder, the unit to generate a result according to the first instruction that is to be stored in a destination register that is to be specified by a third field of the first instruction, the result to include a third plurality of packed 8-bit integers,
the third plurality of the packed 8-bit integers to include an 8-bit integer for each 16-bit integer in the first plurality of the packed signed 16-bit integers, and an 8-bit integer for each 16-bit integer in the second plurality of the packed signed 16-bit integers,
the 8-bit integers to correspond to the first plurality of the packed signed 16-bit integers to be adjacent to one another in the result, and the 8-bit integers to correspond to the second plurality of the packed signed 16-bit integers to be adjacent to one another in the result,
a highest order 8-bit integer of the result to correspond to a highest order 16-bit integer of the first plurality of the packed signed 16-bit integers, and a lowest order 8-bit integer of the result to correspond to a lowest order 16-bit integer of the second plurality of the packed signed 16-bit integers, and
each 8-bit integer of the third plurality of the packed 8-bit integers to include one of (a) a low order 8-bits of a corresponding 16-bit integer and (b) a saturation value,
wherein the decoder is also to decode a second instruction that is to cause the processor to store only half of a plurality of data elements from a first source operand indicated by the second instruction and only half of a plurality of data elements from a second source operand indicated by the second instruction to a destination.

* * * * *